(12) United States Patent
Severinsson

(10) Patent No.: US 6,276,497 B1
(45) Date of Patent: Aug. 21, 2001

(54) ELECTRICALLY ASSISTED BRAKE ACTUATOR

(75) Inventor: Lars Severinsson, Hishult (SE)

(73) Assignee: Sab Wabco AB, Landskrona (SE)

( * ) Notice: Subject to any disclaimer, the term of this patent is extended or adjusted under 35 U.S.C. 154(b) by 0 days.

(21) Appl. No.: 09/422,664

(22) Filed: Oct. 22, 1999

(30) Foreign Application Priority Data

Apr. 24, 1997 (SE) .................................................. 9701531

(51) Int. Cl.⁷ .............................. F16D 55/08; F16D 55/16
(52) U.S. Cl. ..................... 188/72.7; 188/156; 188/343; 188/196 V
(58) Field of Search ..................... 188/166, 167, 188/161, 162, 163, 164, 156, 157, 72.7, 72.1, 136, 148, 201, 196 V, 343

(56) References Cited

U.S. PATENT DOCUMENTS

| | | | |
|---|---|---|---|
| 3,572,478 | * | 3/1971 | Nagle et al. ........................... 188/196 |
| 3,627,081 | * | 12/1971 | Santos ................... 188/343 |
| 3,712,181 | * | 1/1973 | Swander et al. ..................... 188/170 |
| 3,756,354 | * | 9/1973 | Clark ................... 188/72.9 |
| 3,797,613 | * | 3/1974 | Nehr .................... 188/72.9 |
| 3,966,028 | * | 6/1976 | Anderson et al. ................... 188/71.9 |
| 4,194,596 | * | 3/1980 | Garrett et al. ........................ 188/72.7 |
| 4,351,419 | * | 9/1982 | Garrett et al. ....................... 188/71.9 |
| 4,354,582 | * | 10/1982 | Severinsson ......................... 188/197 |
| 4,699,256 | * | 10/1987 | Severinsson ......................... 188/343 |
| 4,784,244 | * | 11/1988 | Carre et al. .......................... 188/156 |
| 4,953,668 | * | 9/1990 | Severinsson ......................... 188/158 |
| 4,953,669 | * | 9/1990 | Severinsson ......................... 188/171 |
| 5,103,944 | * | 4/1992 | Severinsson ......................... 188/343 |

FOREIGN PATENT DOCUMENTS

4403740 * 10/1995 (DE) .................................... 188/343

* cited by examiner

Primary Examiner—Robert J. Oberleitner
Assistant Examiner—Devon Kramer
(74) Attorney, Agent, or Firm—Breiner & Breiner L.L.C.

(57) ABSTRACT

A block brake actuator including in a housing a service brake arrangement, having an electric motor and mechanism for transforming its rotary movement into an axial movement of a push rod, and a safety brake arrangement, including at least one powerful spring, which acts in a brake application direction, may be tensioned at a service brake application and may be locked to the housing in a tensioned state. The spring is arranged transverse of the push rod and acts thereon over a wedge and roller arrangement.

10 Claims, 7 Drawing Sheets

Figure 1:
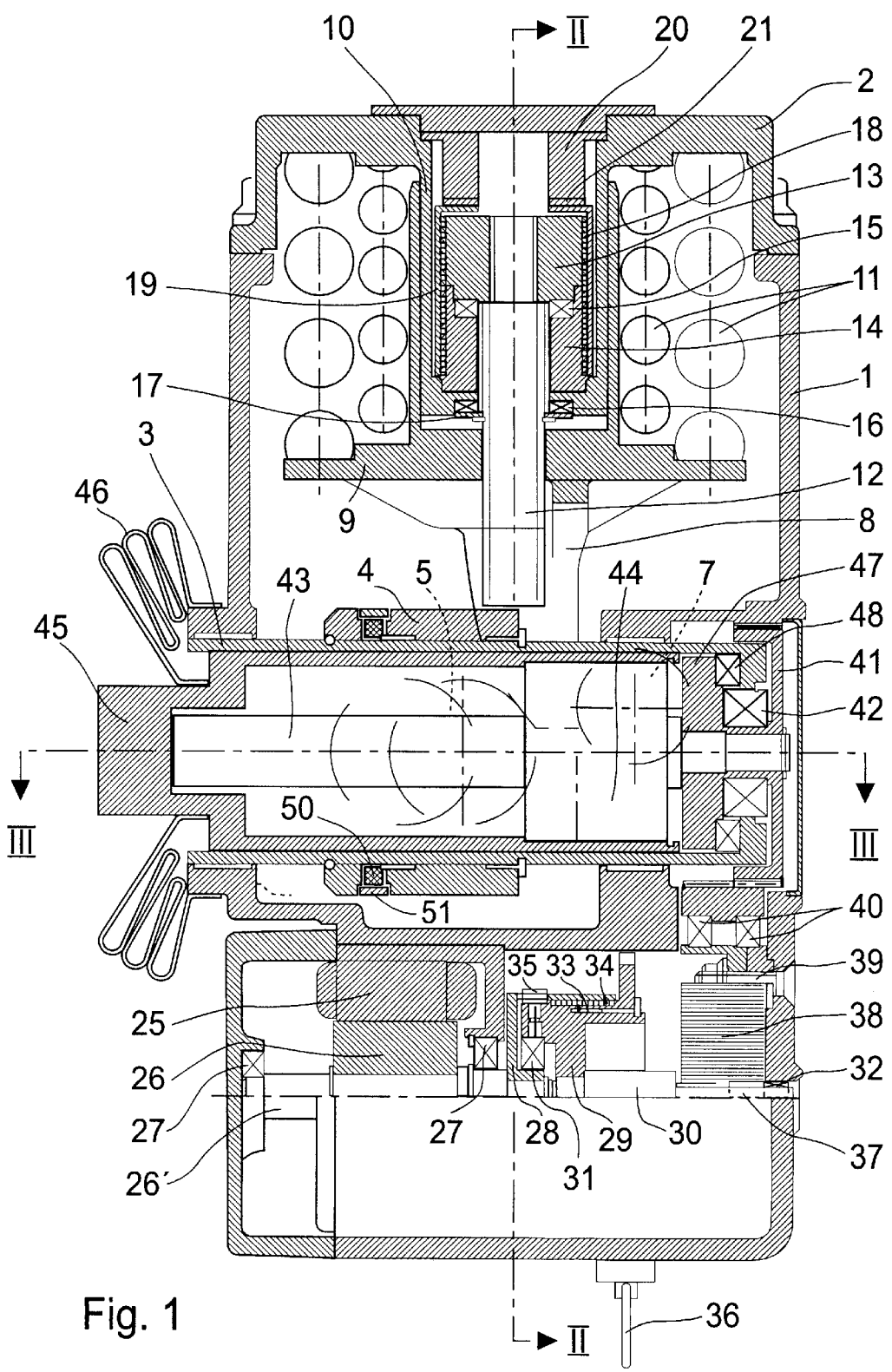

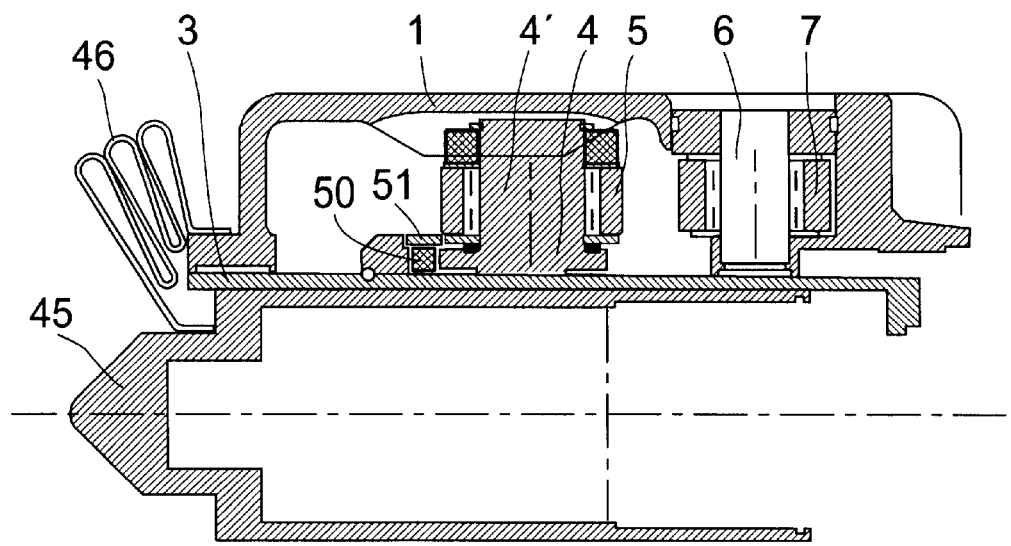
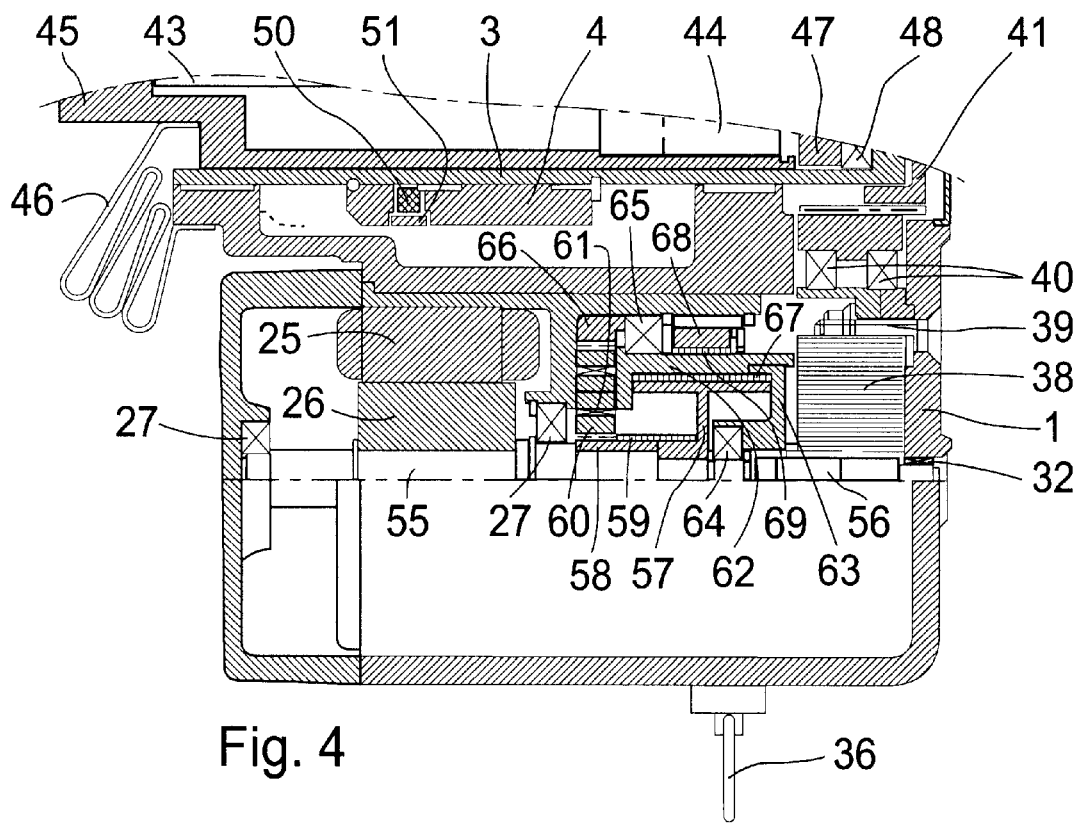
Fig. 3
Fig. 4

ELECTRICALLY ASSISTED BRAKE ACTUATOR

TECHNICAL FIELD

The present invention relates to a brake actuator for delivering a brake force through a brake block or the like to a rotating member to be braked, the actuator comprising in a housing a service brake arrangement, including an electric motor and means for transforming its rotary movement into an axial movement of a push rod, and a safety brake arrangement, including at least one powerful spring, acting in a brake application direction, means for tensioning the spring by the reaction at a service brake application, and mechanical means for locking the spring to the housing in a tensioned state, which locking means can be released at will for accomplishing a safety brake application.

BACKGROUND OF THE INVENTION

A brake actuator of this kind is shown in applicant's WO 96/12634. Special reference is made to FIG. 12 therein with accompanying description, which deals with a disc brake actuator embodying the invention according to said patent publication.

Generally speaking, there is a growing interest in the art of rail vehicle braking to make use of electrical power in one way or another instead of air pressure or hydraulic pressure for the brake application. More specifically, the technique diclosed in said publication with an electrical service brake arrangement and a safety arrangement with a powerful spring may be of interest not only for disc braking as disclosed in the publication but also for block braking, where a brake block or brake shoe is to be brakingly applied against the tread of a rotating wheel.

One of the major problems with present rail vehicle bogie designs is the extremely limited space available for a brake actuator, which has been detrimental to earlier attempts with block brake actuators of the kind referred to.

The main object of the invention is accordingly to accomplish a brake actuator of the kind referred to with a minimum space requirement but yet fulfilling all other requirements posed thereon.

THE INVENTION

This is according to the invention attained in that the spring of the safety brake arrangement is arranged substantially transverse of the push rod and is arranged to act thereon over at least one wedge.

The wedge preferably cooperates with rollers, of which a first one is rotatable on a push rod sleeve, surrounding the push rod, and a second one is rotatable in the housing.

Preferably, two wedges connected to a cup for supporting the spring extend astraddle of the push rod sleeve, and first rollers cooperating therewith are arranged on a force transmitting ring on the push rod sleeve.

An especially advantageous layout may be obtained if the service brake arrangement and the safety brake arrangement are disposed at either side of the push rod, substantially in the same longitudinal plane.

As the application of the brake by means of the electric motor, it is important to obtain a signal, when the desired brake force has been reached.

In the actuator according to the invention the push rod sleeve with its force transmitting ring may for this purpose be provided with a device for emitting such a force-related signal.

Practically, a collar of an elastic material may be disposed between two ring members, of which the force transmitting ring is composed, the collar being surrounded by a closed metal sleeve provided with a strain gauge or the like.

THE DRAWINGS

Figure 2:
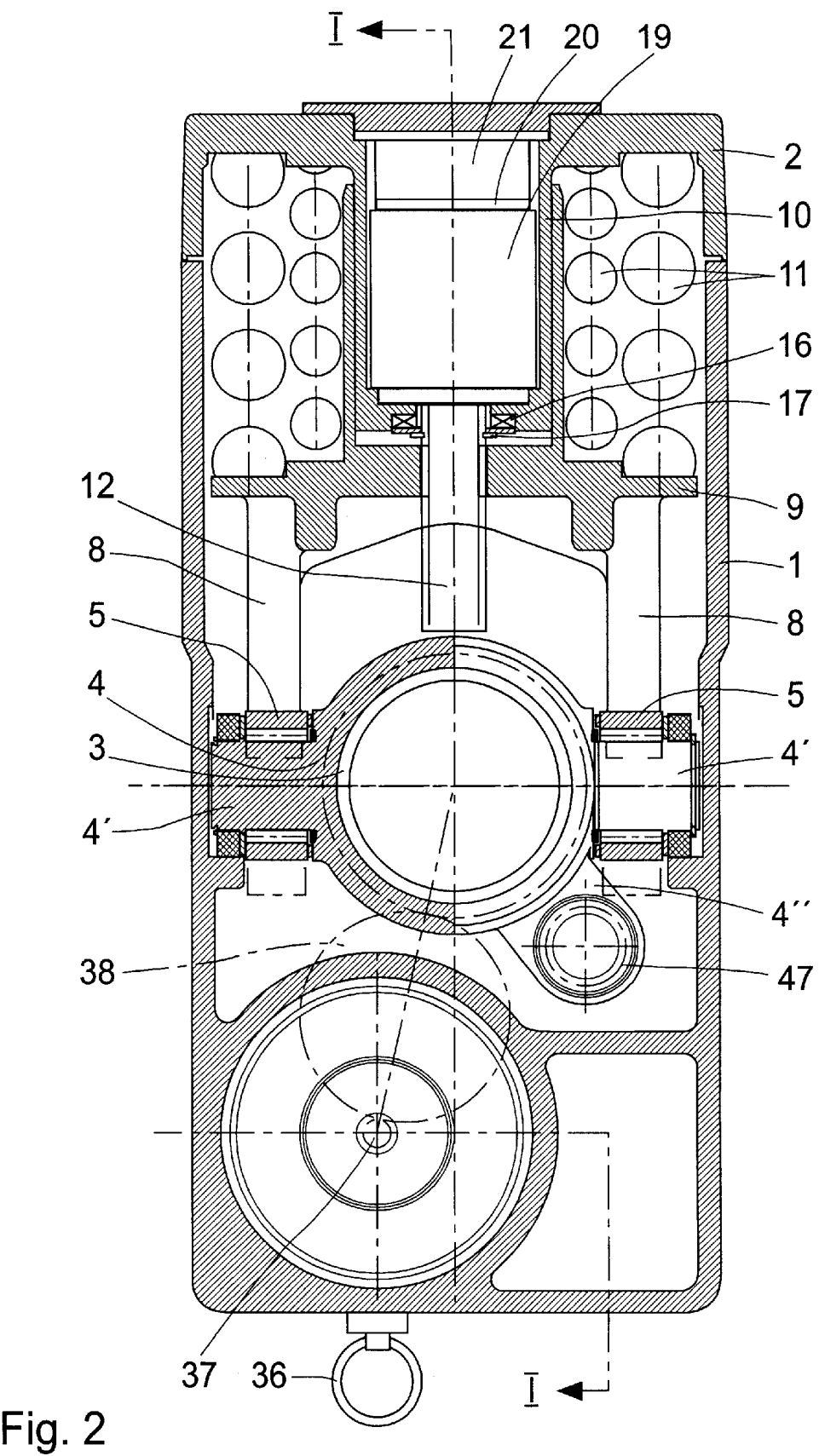
Figure 5:
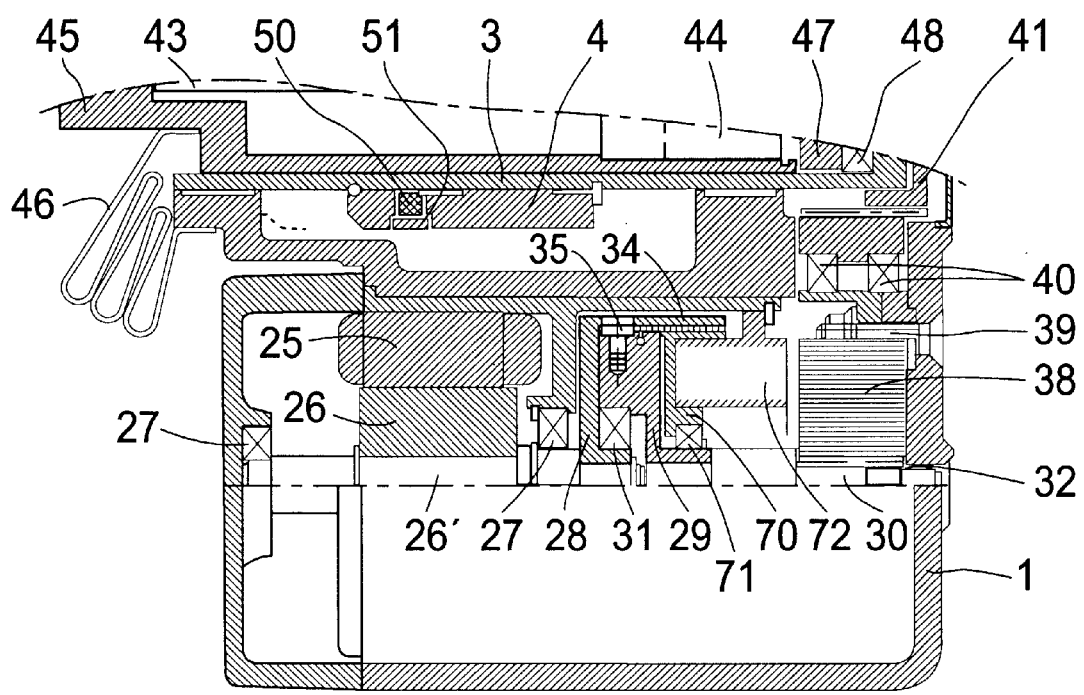
Figure 6:
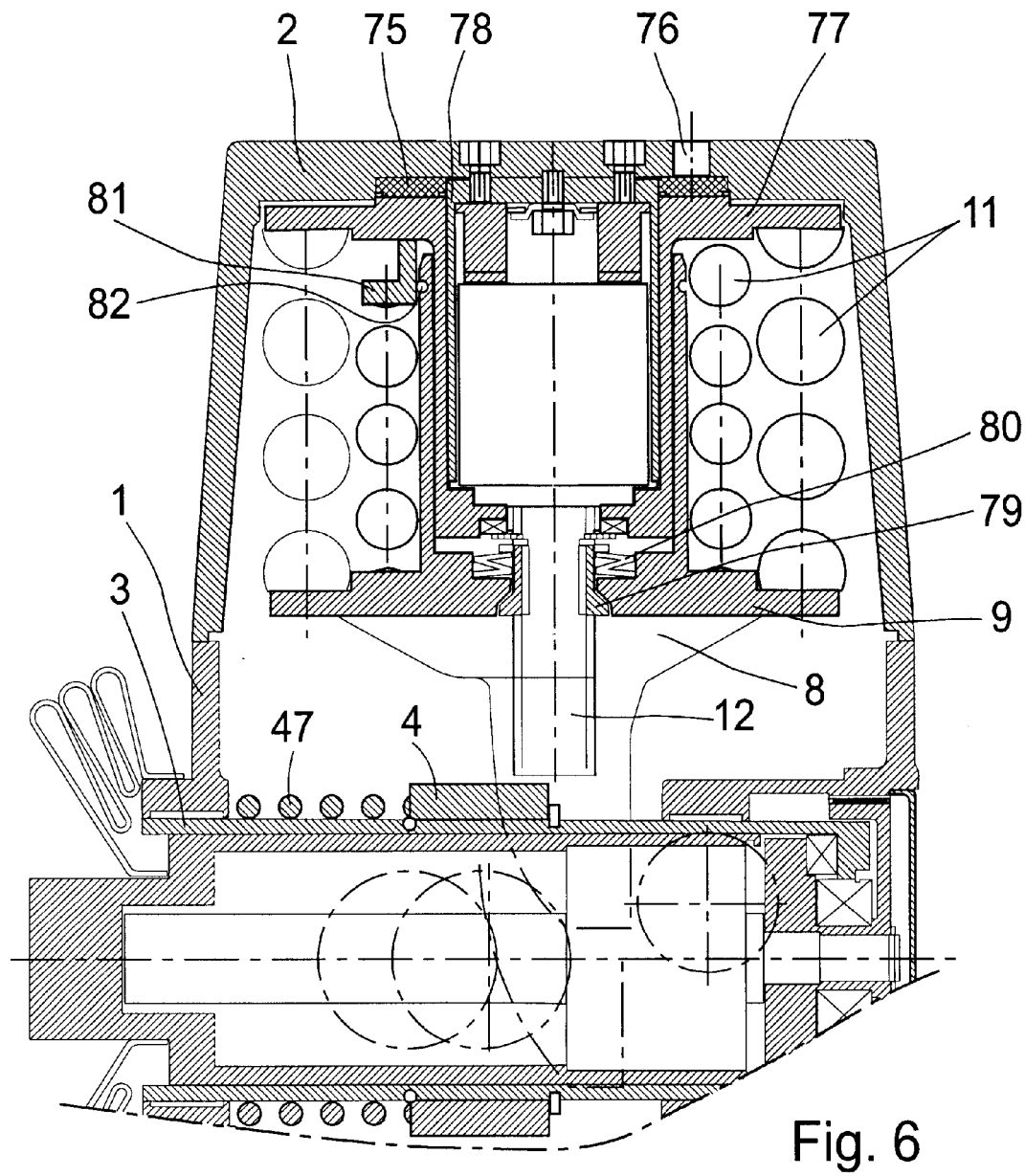
Figure 7:
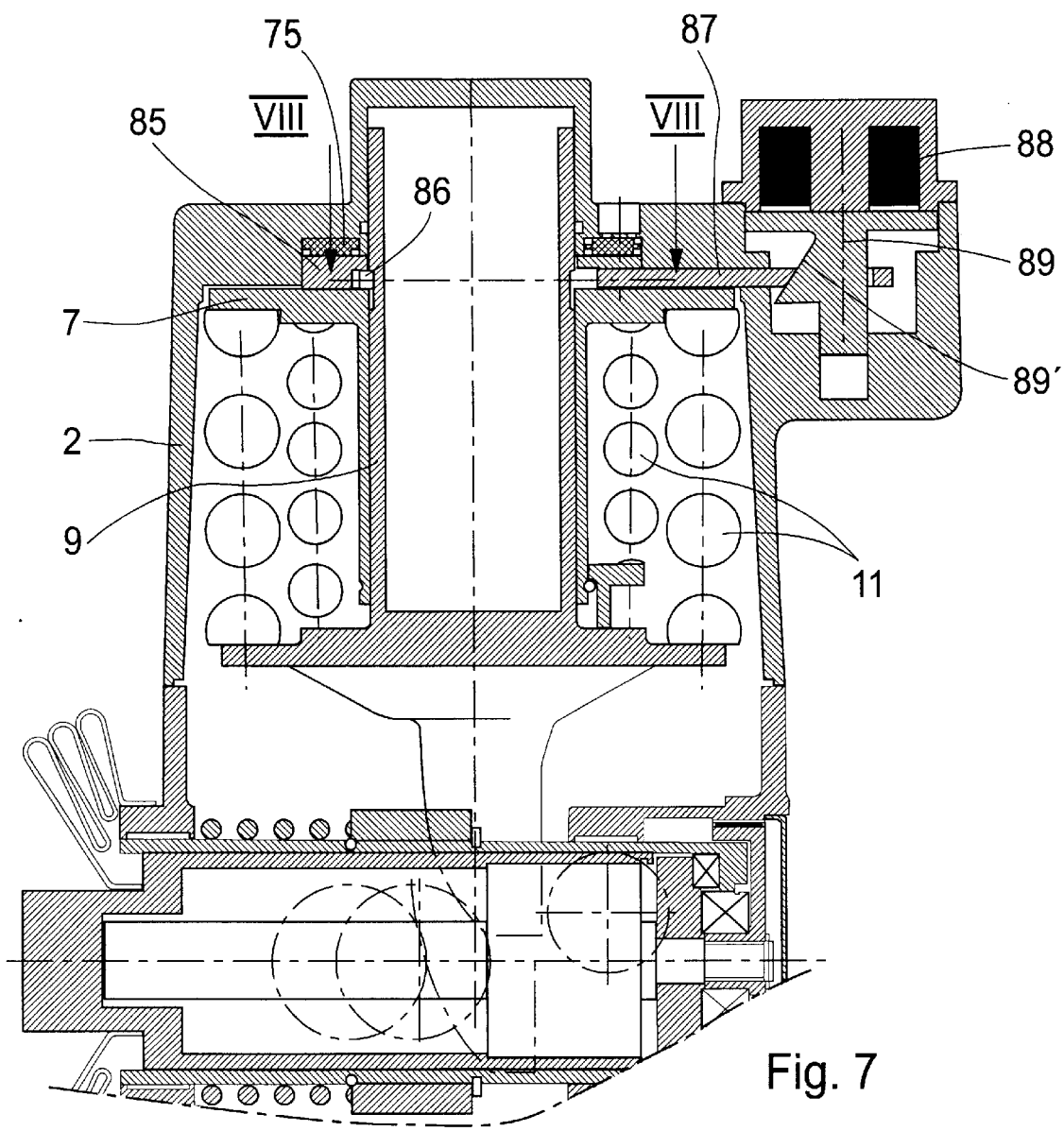
Figure 8:
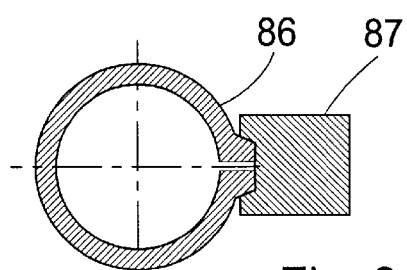
Figure 9:
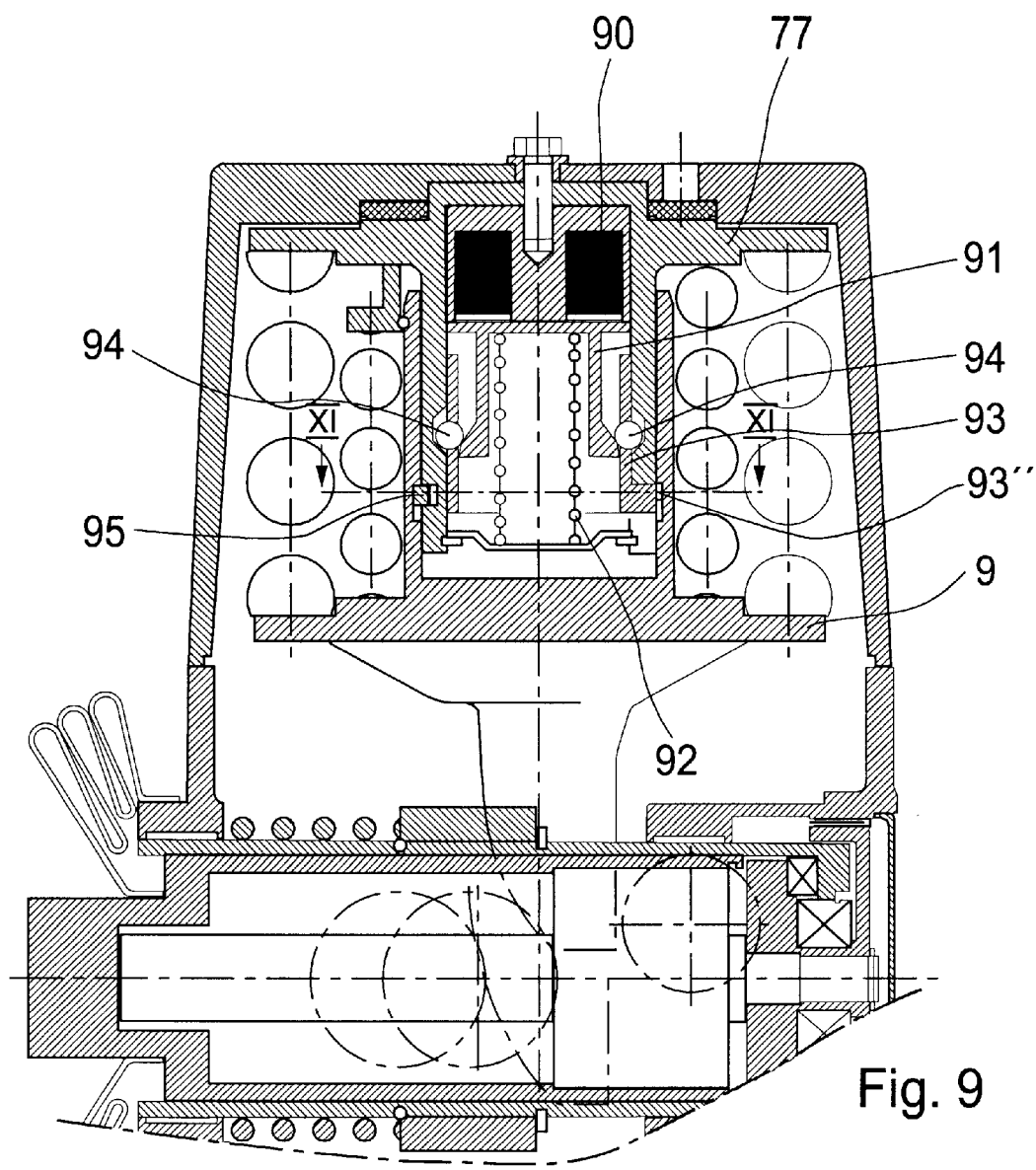
Figures 10, 11:
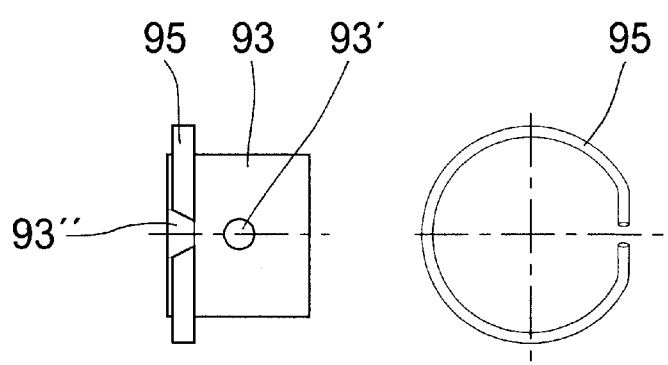

The invention will be described in further detail below reference being made to the accompanying drawings, in which FIG. 1 is a section through a first embodiment of a tread brake unit according to the invention, substantially along the line I—I in FIG. 2, FIG. 2 is another section through the unit of FIG. 1 along the II—II in FIG. 1, FIG. 3 is still another and somewhat simplified section through the unit of FIG. 1 along the line III—III in FIG. 1, FIG. 4 is a section corresponding to the lower part of FIG. 1 of a second embodiment of a tread brake unit according to the invention, FIG. 5 is a section corresponding to the lower part of FIG. 1 of a third embodiment of a tread brake unit according to the invention, FIG. 6 is a section corresponding to the upper part of FIG. 1 of a fourth embodiment of a tread brake unit according to the invention, FIG. 7 is a section corresponding to the upper part of FIG. 1 of a fifth embodiment of a tread brake unit according to the invention, FIG. 8 is a section along the line VIII—VIII in FIG. 7, FIG. 9 is a section corresponding to the upper part of FIG. 1 of a sixth embodiment of a tread brake unit according to the invention, FIG. 10 is a side view of a locking sleeve and spring ring used in the sixth embodiment according to FIG. 9, and FIG. 11 is a top view along the line XI—XI in FIG. 9 of the spring ring also shown in FIG. 10.

DETAILED DESCRIPTION OF EMBODIMENTS

A tread brake unit according to the invention is to be mounted in the undercarriage of a rail vehicle in the vicinity of a wheel to be braked. The tread brake unit is provided with a brake block holder with a brake block, but these known means are omitted on the drawings for the sake of clarity.

Reference is first made to FIGS. 1–3 showing a first embodiment of the invention.

The unit has a housing 1 with a top cover 2 attached thereto.

A push rod sleeve 3 is axially movably arranged in the housing 1 substantially perpendicular to its longitudinal axis or in other words in the right/left hand direction in the drawings. This push rod sleeve 3 is guided by and extends out of the housing 1; it is intended to transmit to the brake block holder a brake force produced by the unit.

Attached to the push rod sleeve 3 is a force transmitting ring 4 having two diametrically opposed tappets 4' each provided with a rotatable push rod roller 5, as is most clearly shown in FIG. 2.

Attached in the housing 1 in the vicinity of the rollers 5 are two tappets 6 each provided with a rotatable roller 7.

By introducing a wedge-shaped member 8 between each pacer of rollers 5, 7 a movement to the left in the drawings of the push rod sleeve 3 may be accomplished. Each such member 8 has a straight surface, parallel to the longitudinal direction of the housing 1, in contact with the housing roller 7 and a sloping or curved surface in contact with the push rod roller 5.

The two wedge-shaped members 8 are integral with a spring support cup 9 having a cylindrical portion in axially guiding engagement with a guide sleeve 10 of the cover 2. Two powerful compression springs 11 are arranged between a disc-shaped part of the spring support cup 9 and the housing cover 2 for urging the cup 9 with its wedge-shaped members 8 downwardly in the drawing and thus for moving the push rod sleeve 3 to the left in the drawing.

However, normally the spring support cup 9 is held to the housing cover 2 by a mechanism now to be described.

A threaded pin 12 is in engagement with a central threaded bore in the disc-shaped part of the spring support cup 9. The pin 12 extends through a central hole in the lower part of the guide sleeve 10 and is attached to a cylindrical pin support 13 within the guide sleeve 10. A cylinder 14 arranged below and having the same outer diameter as the pin support 13 is attached to the lower part of the guide sleeve 10. The pin 12 extends freely through the cylinder 14. The pin support 13 is journalled in relation to the cylinder 14 by means of a thrust bearing 15. In the lower end of the guide sleeve 10 there is a further axial bearing 16 for allowing rotation of the upon 12 thereon via a washer 17.

A locking spring 18 is arranged around the pin support 13 and the cylinder 14. The lowermost turns of the locking spring 18 are attached to a locking sleeve 19 surrounding the locking spring 18. This locking sleeve 1 is at its end provided with a ring 20 for cooperation with an electromagnet 21 attached to the cover 2

In normal operation the springs 11 are compressed. The electromagnet 21 is energized, so that the locking sleeve 19 is kept against rotation. Via the locking spring 18 also the pin support 13 and thus the pin 12 are kept against rotation, so that the spring support cup 9 keeps the springs 11 compressed.

If the electromagnet 21 is deenergized, a safety brake function under the action of the springs 11 is released. The deenergizing of the electromagnet 21 allows the locking sleeve 19 to rotate and—due to the locking direction of the locking spring 18—also the pin support 13 and the pin 12. Hereby the spring support cup 9 with the wedge-shaped members 8 are free to move downwards in FIG. 1 under the action of the springs 11. The wedge-shaped members 8 move down between the respective pair of rollers 5 and 7 accomplishing a brake applying movement to the left in the drawing of the push rod sleeve 3 via the force transmitting ring 4.

After a use as described the safety brake with the springs 11 can be returned to its shown position ready for renewed use in the following manner: By other means to be described the push rod sleeve 3 with the force transmitting ring 4 is moved to the right in FIG. 1, so that the wedges 8 and the spring support cup 9 are moved upwards compressing the springs 11. During this operation the electromagnet 21 is energized, but the locking direction of the locking spring 18 is such that the pin 12 is free to rotate on the thrust bearing 16. When the operation is finished, the parts have attained the positions shown in FIG. 1, and the locking spring 18 will effectively prevent any rotation of the pin 12, so that the springs 11 are kept compressed, as long as the electromagnet 21 is energized.

The above described design with the spring actuated wedges 8 and the means for controlling this actuation may be defined as a safety or security brake, whereas a service brake design will now be described.

In the lower part of the housing 1 under the push rod sleeve 3 there is an electric motor, comprising a stator 25 fixedly mounted in the housing 1 and a rotor 26 with a shaft 26' rotatably mounted in the housing 1 by means of ball bearings 27. Attached to the rotor shaft 26' is a drive sleeve 28. A driven sleeve 29 is attached to a driven shaft 30 coaxial with the rotor shaft 26'. The driven shaft 30 is journalled by means of a bearing 31 between the driving sleeve 28 and the driven sleeve 29 as well as by a housing bearing 32.

A locking sleeve 33 is rotatably arranged on the driven sleeve 29, and a locking spring 34 is arranged on coaxial cylindrical surfaces of the driven sleeve 29 and the locking sleeve 33 and internal of the drive sleeve 28, as appears in FIG. 1. The drive sleeve 28 and the driven sleeve 29 are coupled together by means of a pin or screw 35, which is attached in the driven sleeve 29 and cooperates with a circumferential slot in the drive sleeve 28.

The locking sleeve 33 has a toothed circumference for engagement with a spring biassed plunger (not shown) with a pull ring 36 in the lower part of the housing 1. By pulling this ring 36, the locking sleeve 33 will be free to rotate, which will enable a movement of the vehicle on which the unit is mounted or an exchange of a worn-out brake block connected to the unit, when the safety brake described above has accomplished a brake application in the absence of electricity for the normal operation of the device.

The arrangement (parts 28, 29, 33–35) is such that (when the locking sleeve 33 is held against rotation by the spring biassed engagement of the said plunger) the driving rotation of the motor 25, 26 is transmitted to the driven shaft 30, whereas a rotation in the opposite direction by the driven shaft 30 will not be allowed due to the locking spring 34. This means that when the electric motor 25, 26 has stopped its rotation in the driving or brake application direction, no reverse rotation of the driven shaft 30 is allowed.

Towards its end to the right in FIG. 1 the driven shaft 30 is provided with a pinion 37 in toothed engagement with a gear wheel 38, which is journalled on a shaft 39 in the housing 1 by means of bearings 40.

This gear wheel 38 in turn is in toothed engagement with a gear ring 41, which is coaxial with the push rod sleeve 3 and is journalled therein by means of a radial bearing 42. The gear ring 41 is attached to the screw 43 of a device for transforming a rotational movement into an axial movement, for example a so called ball screw, whose ball housing 44 is internally attached to a push rod 45, axially movable inside the push rod sleeve 3. Towards its end to the right in FIG. 1 the screw 43 is provided with a ring 47, which is journalled in relation to the push rod sleeve 3 by means of an axial bearing 48.

A rubber bellows 46 is arranged between the housing 1 and the push rod 45 for preventing the intrusion of moisture, dirt and the like.

The push rod sleeve 3 may assume different axial positions relative to the housing 1, and for that reason the gear wheel 38 has a substantial axial length in relation to the gear ring 41.

There is a return spring arrangement for the push rod sleeve 3 and the force transmitting ring 4, which is not visible in FIG. 1 but only in FIG. 2. The force transmitting ring 4 is provided with an ear 4" extending obliquely down to the right in FIG. 2. A return spring 47 of compression type acts on the ear 4" for biassing the ring 4 and thus the push rod sleeve 3 to the right in FIG. 1.

By means of the described arrangement a rotation of the screw 43 imparted by the electric motor 25, 26 via the pinion 37, the gear wheel 38 and the gear ring 41 will result in an axial displacement to the left in the drawing of the push rod 45 for applying a brake block connected thereto against a wheel of the vehicle.

Also, when the safety brake has been applied under the action of the compressed springs 11 due to an interruption in the current supply, it will be returned to the position shown in the drawings—ready for a new safety action—at the next subsequent brake application by the electric motor 25, 26.

The normal brake application or movement to the left of the push rod 45 by means of the electric motor 25, 26 has been described above. When the rotation direction of the motor is reversed for a return stroke of the brake, the relative position of the screw or pin 35 in its slot in the drive sleeve 28 will be changed, so that the locking effect of the locking spring 34 in this rotation direction will be neutralized.

It appears from FIGS. 1 and 3, that the force-transmitting ring 4, which functionally may be regarded as integral, is divided into two ring members with a collar 50 of an elastic material interposed between these ring members. A metal sleeve 51 is arranged in a groove formed in the two ring members and is in contact with and completely surrounds the collar. At a brake application the collar 50 will be compressed by the two ring members together forming the ring 4 and will hereby exert a widening or straining force on the sleeve 51, which may be provided with a strain gauge or the like for providing a signal for stopping the motor 25, 26, when a desired brake application force has been obtained.

At a following brake release, when the motor 25, 26 is rotated in the reverse direction, this rotation is performed until the signal from the strain gauge or the like is at a threshold value and then a predetermined number of revolutions (controlled by the electronics of the actuator) for obtaining a certain desired slack between the brake block and the wheel.

The modifications or embodiments shown in FIGS. 4 and 5 are only amended in the lower portion or service brake portion of the unit, and accordingly only that portion is shown. Parts that in principle are unamended have the same reference numerals as in the first embodiment.

In FIG. 4 the rotor 26 has a shaft 55, rotatably mounted in the housing 1 by means of bearings 27. Coaxial with the rotor shaft 55 is a driven shaft 56 connected to the gear wheel 38 and journalled in the housing 1 by means of the housing bearing 32.

Attached to the rotor shaft 55 is a driving sleeve 57, which is connected for rotation in one direction to a planet wheel 58 of a planetary gear (to be further described) by means of a first locking spring 59. The planet wheel 58 is rotationally arranged on the rotor shaft 55 and is in gear engagement with a sun-wheel 60.

The sun wheel 60 is journalled by means of a bearing 61 on a tappet of a sun sleeve 62, which is rotationally connected to a driven sleeve 63 attached on the driven shaft 56. A bearing 64 is arranged between the driven sleeve 63 and the rotor shaft 55. Also, the driven sleeve 63 is journalled relative to the housing 1 by means of a bearing 65. The sun wheel 60 is in gear engagement with a gear ring 66 fixedly arranged in the housing 1.

A one-way coupling in the form of a second locking spring or servo-spring 67 is arranged between on one hand the driving sleeve 57 and on the other hand the sun sleeve 62 and the driven sleeve 63.

A locking sleeve 68 is rotationally arranged in the housing 2 but is normally locked against rotation by means of a spring-biassed plunger (not shown) operated by the pull ring 36. There is a one-way coupling in the form of a third locking spring 69 between the sun sleeve 62 and the locking sleeve 68.

By the described arrangement and with appropriate locking directions of the three locking springs 59, 67 and 69, the following functions are obtained with the result that the rotation in the brake application direction of the rotor shaft 55 will be geared up to the driven shaft 56 but not in the release direction:

When the rotor shaft 55 rotates in the brake application direction, the rotation will be transferred by the first locking spring 59 to the planet wheel 58 and via the sun wheel 60 to the sun sleeve 62 and the driven sleeve 63 connected by the servo spring 67. In the opposite rotational direction of the rotor shaft 55 for brake release the sun sleeve 62 (and thus the planet gearing) is prevented from rotation in this direction by the third locking spring 69. The servo spring 67 will be opened by the driving sleeve 57, so that the rotation is directly transferred from the driving sleeve 57 to the driven sleeve 63.

A still further modification is shown in FIG. 5. The design has great similarities with that shown in FIGS. 1–3, and the same reference numerals have been used for corresponding parts, although they may differ in shape in the two cases. Especially, the following parts may also be found in the FIG. 5 version: the rotor shaft 26', the bearing 27, the driving sleeve 28, the driven sleeve 29, the driven shaft 30, the bearing 31, the locking spring 34, and the pin or screw 35.

In this modification a locking sleeve 70 is journalled on the driven sleeve 29 by means of a bearing 71, and the locking spring 34 is arranged between the driving sleeve 28 and the locking sleeve 70. A permanently magnetized magnet brake 72 is fixedly arranged in the housing 1 at the locking sleeve 70. The magnet brake 72 is of the active or inverse type in the sense that it normally keeps the locking sleeve 70 locked thereto and that a current has to be supplied to it for release of the locking sleeve 70, which is in analogy with the mechanical release mechanism in the first embodiment shown in FIGS. 1–3. Alternatively, the brake may be spring-applied and magnetically released.

As a modification to the embodiment according to FIG. 4, the locking sleeve 68 therein may be locked or braked by such means as are described with reference to FIG. 5, especially a permanently magnetized magnet brake.

FIGS. 6–11 illustrate three further embodiments. Only the upper parts of the respective units are shown in FIGS. 6, 7 and 9, because the modifications to be discussed are in those parts of the units. Only reference numerals necessary for a proper understanding of the modifications are used for the sake of clarity.

The fourth to sixth embodiments shown in FIGS. 9–11 have an important difference in common in relation to the three embodiments described above, namely the position of the sensing means for the brake application force. In these first three embodiments the force-transmitting ring 4 is divided, and an elastic collar 50 is arranged between its two parts. The added length of the ring 4 means—as is shown in FIG. 2—that the return spring 47 will have to be arranged to act on a separate ear 4". Also, the transmission of the signals from the elastic collar 50 may be cumbersome due to its position inside the housing on a moving part.

In the embodiments according to FIGS. 9–11 the force-transmitting ring 4 is not divided, and the return spring 47 is arranged around the push rod sleeve 3 between the housing 1 and the force-transmitting ring 4.

The sensing means for the brake application force is in this case a ring 75 of an elastic material arranged in a corresponding circular groove in the housing cover 2. The pressure in the ring 75 is sensed by a pressure gauge 76 in the housing cover 2, from where it is more convenient to transmit than from the internal, movable force-transmitting ring 4.

The design of the fourth embodiment according to FIG. 6 differs in certain respects from that of the first embodiment according to FIG. 1 mainly as a result of the relocation of the force sensing means.

The function of the force sensing means is to sense the brake application force, which in this embodiment is transmitted from the two wedge-shaped members 8 through the spring support cup 9 and the compression springs 11, which hereby are totally compressed (held by the pin 12 and ready for safety brake action). For this reason the upper ends of the compression springs 11 are supported by an upper spring support sleeve 77 engaging the ring 75. As this sleeve 77 has a certain possibility to move non-axially, it is guided by an added guide sleeve 78 attached to the housing cover 2.

For accomplishing a linear feed-back in this design the wedge portions active in this working area have to be straight.

Further, in this case the threaded pin 12 is not in direct thread engagement with the spring support cup 9 but only via a nut 79 in conical or toothed engagement with the cup 9 under the action of a clutch spring 80. The purpose of this extra clutch between the pin 12 and the cup 9 is to allow a disengagement of the clutch at a so called push-back, i e a greater than normal movement of the push rod sleeve 3 induced externally for example due to soft bogies in modern vehicle designs.

A further measure is shown to the left in FIG. 6 and is to be seen as a modification of the version shown to the right therein. Here the inner one of the compression springs 11 is not directly supported by the upper spring support sleeve 77 but rather by a spring collar 81 connected to the spring support cup 9 by means of a spring ring 82 or the like in such a way that the inner spring 11 is short-circuited or passive except at push back.

The maximal brake force at security braking under the action of the compression springs 11 can be limited to correspond to the service braking in tare, i e less than maximum service braking.

The purpose of FIGS. 7 and 9 is to illustrate two alternative ways of activating the safety brake function under the action of the compressed springs 11. These two embodiments may be provided with the modifications described above under reference to FIG. 6, but these modifications will not be described again.

In the embodiment according to FIG. 7 a support collar 85 is arranged between the upper spring support sleeve 77 and the force sensing ring 75 in the housing cover 2. The spring support cup 9 and the upper spring support sleeve 77 are somewhat differently designed than in the FIG. 1 embodiment but retain the same reference numerals for the sake of clarity. The spring support cup 9 is here guided for axial movements by the housing cover 2, whereas the upper spring support sleeve 77 is arranged externally of the spring support cup 9 and is guided thereby.

A slitted spring ring 86 is arranged in a recess in the support collar 85 and may in an unexpanded position as shown in FIG. 7 (as well as in FIG. 8) be held in engagement with a circumferential, external groove in the spring support cup 9 preventing relative axial movement between the cup 9 and the sleeve 77 in a safety brake application direction. Said groove has a certain axial width for allowing the above related push-back movement.

As shown in FIG. 8, the free ends of the spring ring 86 are slanted and cooperate with inner slanted surfaces of a slide 87 axially movable in the cover 2. The slide 87 can normally be held in the locking position shown in FIGS. 7 and 8 by means of an electromagnet 88 acting on an armature 89 having a wedge 89' in engagement with a corresponding surface of the slide 87.

When the electromagnet 88 is deenergized, the slide 87 is allowed to move to the right in FIGS. 7 and 8 leaving the locking engagement with the spring ring 86, which may expand and in turn leave its locking engagement with the cup 9, so that the safety brake is applied under the action of the compression springs 11.

As a modification the slide 87 could constitute the armature for the electromagnet, which in such a case is turned 90° in relation to the position shown in FIG. 7.

Another way of normally holding the spring support cup 9 and the upper spring support sleeve 77 together is illustrated in FIGS. 9–11.

Here an electromagnet 90 is arranged inside the upper spring support sleeve 77. The spring support cup 9 is externally axially guided by the sleeve 77. An axially movable armature 91 is arranged within the sleeve 77 and is biassed upwards against the electromagnet 90 by means of a compression spring 92. (A similar spring could be provided for the armature 89 in the embodiment in FIG. 7.) A locking sleeve 93 is axially movably arranged within the sleve 77 but outside the armature 91. Locking balls 94 are arranged in locking sleeve openings 93'. These balls 94 can engage internal recesses in the sleeve 77 and are held in engagement therewith by sloping surfaces on the armature 91, as long as the latter is held by the electromagnet 90.

In an external circumferential groove in the sleeve 77 there is arranged a spring ring 95. The spring ring 95 can be held expanded into engagement with a corresponding internal circumferential groove in the cup 9 by means of a wedge-shaped radial protrusion 93" of the locking sleeve 93. Such engagement occurs when the locking sleeve 93 is moved upwards in FIG. 9 by means of the armature 91 acting on the balls 94.

When on the other hand the electromagnet 90 is deenergized allowing the armature 91 to move downwards in FIG. 9, the balls 94 can leave their engagement with the recesses in the sleeve 77, so that the locking sleeve 93 also can move downwards in FIG. 9 and the spring ring 95 is contracted and leaves its locking engagement with the cup 9.

What is claimed is:

1. A brake actuator for delivering a brake force through a brake block to a rotating member to be braked, the actuator comprising in a housing a service brake arrangement, including an electric motor and means for transforming rotary movement of the motor into an axial movement of a push rod, and a safety brake arrangement, including at least one powerful spring, acting in a brake application direction, means for tensioning the at least one spring by a reaction force at a service brake application, and mechanical means for locking the at least one spring to the housing in a tensioned state, which means for locking can be released at will for accomplishing a safety brake application, wherein the at least one spring of the safety brake arrangement is arranged substantially transverse of the push rod and is arranged to act thereon over at least one wedge.

2. An actuator according to claim 1, wherein the at least one wedge cooperates with rollers, of which a first roller is rotatable on a push rod sleeve, surrounding the push rod, and a second roller is rotatable in the housing.

3. An actuator according to claim 1, wherein said at least one wedge includes two wedges, connected to a cup for supporting the at least one spring, which extend astraddle of a push rod sleeve and first rollers cooperating therewith are arranged on a force transmitting ring on the push rod sleeve.

4. An actuator according to claim 1, wherein the service brake arrangement and the safety brake arrangement are disposed at either side of the push rod, substantially in the same longitudinal plane.

5. An actuator according to claim 3, wherein the push rod sleeve with the force transmitting ring is provided with a device for emitting a force-related signal.

6. An actuator according to claim 5, wherein said device is a collar of an elastic material disposed between two ring members, of which the force transmitting ring is composed, and that the collar is surrounded by a closed metal sleeve provided with a strain gauge.

7. An actuator according to claim 3, wherein a device for emitting a force-related signal is arranged in a cover of the housing and is acted on by force from the at least one wedge via the at least one spring when compressed.

8. An actuator according to claim 7, wherein a ring of an elastic material is disposed in the cover in contact with a pressure gauge and that the at least one spring is supported by an upper spring support sleeve engaging the ring.

9. An actuator according to claim 1, wherein the service brake arrangement is provided with means in a rotational drive chain between the motor and the push rod for enabling operation of the motor in either rotation direction for brake application and release but preventing rotation induced from the push rod.

10. An actuator according to claim 9, wherein the service brake arrangement is provided with means in said rotational drive chain for gearing up rotational speed in a brake application direction only.

* * * * *

UNITED STATES PATENT AND TRADEMARK OFFICE
CERTIFICATE OF CORRECTION

PATENT NO. : 6,276,497 B1  
DATED : August 21, 2001  
INVENTOR(S) : Lars Severinsson Page 1 of 1

It is certified that error appears in the above-identified patent and that said Letters Patent is hereby corrected as shown below:

<u>Title page,</u>  
Insert  
-- Related U.S. Application Data  
[60] Continuation of PCT/SE98/00747 filed April 24, 1998. --

<u>Column 3,</u>  
Line 26, "upon" should read -- pin --.

Signed and Sealed this

Twenty-sixth Day of February, 2002

*Attest:*

JAMES E. ROGAN  
*Director of the United States Patent and Trademark Office*

*Attesting Officer*